March 26, 1946.  T. L. WEYBREW  2,397,226
CONTROL SYSTEM
Filed Jan. 21, 1944
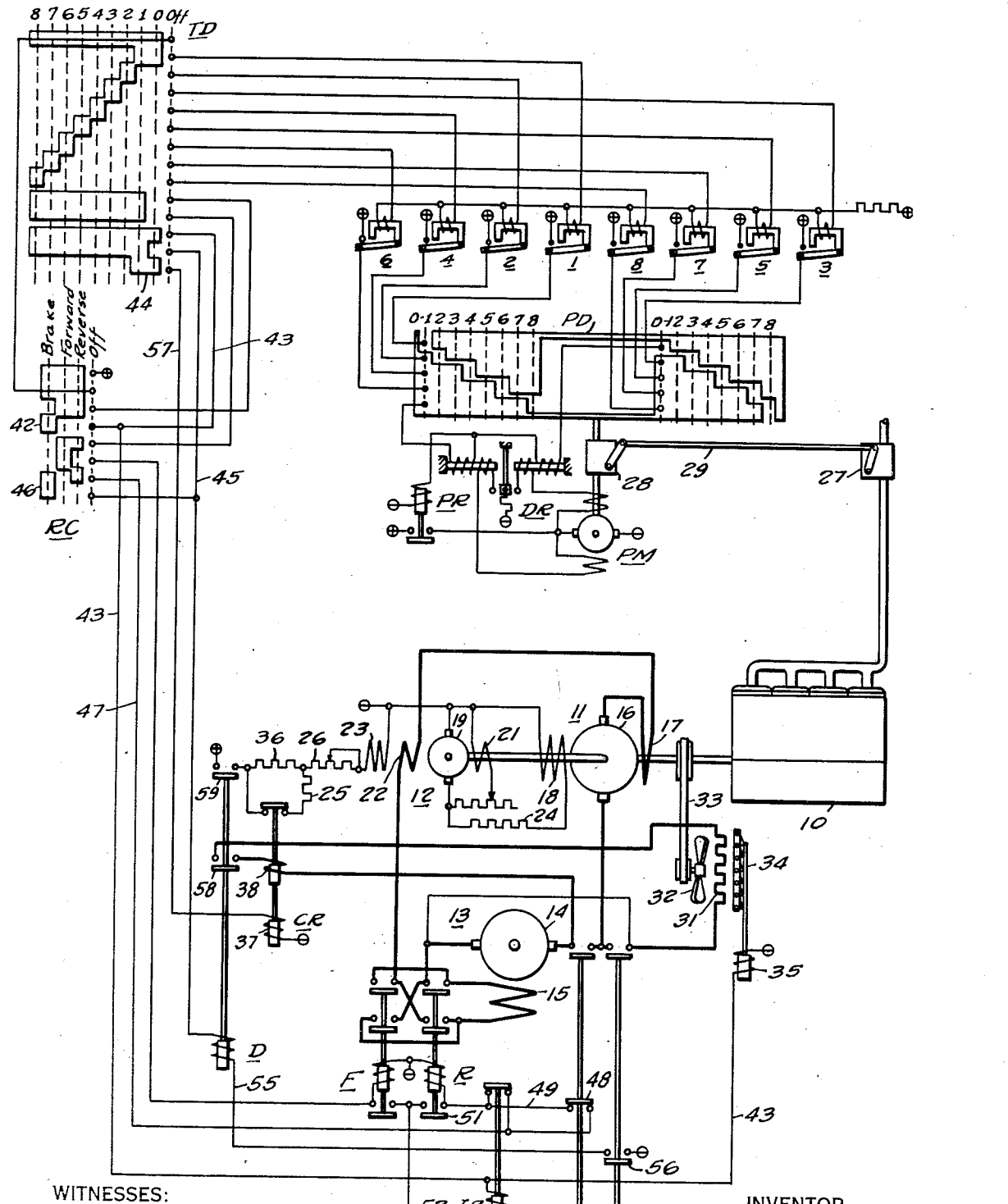
WITNESSES:
INVENTOR
Thelbert L. Weybrew.
BY
ATTORNEY Patented Mar. 26, 1946

2,397,226

UNITED STATES PATENT OFFICE 2,397,226

CONTROL SYSTEM

Thelbert L. Weybrew, Edgewood, Pa., assignor to Westinghouse Electric Corporation, East Pittsburgh, Pa., a corporation of Pennsylvania Application January 21, 1944, Serial No. 519,175

8 Claims. (Cl. 290—17)

My invention relates, generally, to control systems and, more particularly, to systems for controlling the dynamic braking of self-propelled vehicles, such as Diesel-electric locomotives.

In order to reduce the wear on brake shoes and wheels, electric braking is desired on certain main line locomotives of the Diesel-electric type to control the speed of a train while descending a grade. One method of braking now in use causes the traction motors to operate as self-excited series generators which circulate current through heat-dissipating resistors. In such a system heavy duty switching apparatus is required to vary the resistance to obtain the desired variation of the retarding tractive effort.

An object of my invention, generally stated, is to provide a dynamic braking system for a self-propelled locomotive which shall be simple and efficient in operation and which may be economically manufactured and installed.

A more specific object of my invention is to provide for separately exciting a motor which functions as a generator during dynamic braking of a self-propelled locomotive.

Another object of my invention is to provide for controlling the voltage of a generator which excites a motor during dynamic braking, thereby controlling the braking current.

A further object of my invention is to vary the voltage of the exciting generator by controlling the speed of the engine which drives the generator during dynamic braking.

Still another object of my invention is to provide for automatically limiting the maximum braking current produced during the dynamic braking of a vehicle.

A still further object of my invention is to vary the ventilation of a dynamic braking resistor in proportion to the braking current.

Other objects of my invention will be explained fully hereinafter or will be apparent to those skilled in the art.

In accordance with one embodiment of my invention the generator of a Diesel-electric locomotive is utilized to excite the traction motor during dynamic braking and the speed of the engine which drives the generator is controlled in the same manner as during motoring, thereby varying the braking current which is limited by a relay that is responsive to the motor armature current and controls the voltage of the exciter for the generator. The ventilating fan for the dynamic braking resistor is also driven by the engine. Therefore, the ventilation of the resistor is proportional to the engine speed which increases with the braking current.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises an internal combustion engine 10 which drives a generator 11 and an exciter 12 for the generator 11. The generator 11 supplies current to a traction motor 13 which may be of a type suitable for propelling a vehicle (not shown) and has an armature winding 14 and a series field winding 15. The generator 11 is provided with an armature winding 16, a commutating field winding 17 and a separately excited field winding 18. The exciter 12 is provided with an armature winding 19, a shunt field winding 21, a differential field winding 22 and a separately excited field winding 23.

As shown, the field winding 18 of the generator 11 is energized through a resistor 24 by the armature 19 of the exciter 12. The field winding 23 of the exciter 12 may be energized from a suitable source, such as a battery, through resistors 25 and 26. Electrically operated reversing switches F and R are provided for reversing the field winding 15 of the motor 13 in the usual manner.

As described in the copending application of C. C. Whittaker, Serial No. 402,810, filed July 17, 1941, the speed of the engine 10 may be controlled by a pilot motor PM which operates a throttle or governor 27 through a suitable gearing 28 and a connecting link 29. As explained in the aforesaid application, the operation of the pilot motor PM is controlled by a directional relay DR, a pilot relay PR, a pilot drum PD driven by the motor PM, a plurality of relays 1 to 8, inclusive, and a manually operable throttle drum TD. The operation of the pilot motor PM is so controlled that it may be operated in either direction to increase or decrease the engine speed in accordance with the position of the throttle drum TD.

In order that the traction motor 13 may be utilized to retard the movement of the vehicle by dynamic braking, a dynamic braking resistor 31 is provided for dissipating the heat produced by the current generated by the motor 13 during dynamic braking. A fan 32, which may be driven by the engine 10 through a belt 33, is provided for circulating air across the resistor 31.

Adjustable shutters 34 are provided for controlling the amount of air circulated by the fan 32. As shown, the shutters 34 may be opened by a solenoid device 35 which is energized during braking operation, as will be more fully described hereinafter.

In addition to the foregoing apparatus, an electrically operated switch P is provided for connecting the motor 13 to the armature winding 16 of the generator 11 during motoring operation. An electrically operated switch C is provided for connecting the armature winding 16 of the generator 11 across the series field winding 15 of the motor 13 during braking and a switch D is provided for connecting the armature winding 14 of the motor 13 across the resistor 31 during braking.

The foregoing switches are so interlocked that it is necessary for the switch C to be opened before the switch P can be closed and the switch C to be closed before the switch D can be closed. The operation of these switches, as well as the reversing switches F and R, is controlled by a reversing controller RC in cooperation with the throttle drum TD and an interlocking relay IR.

In order to limit the braking current which can be generated by the motor 13, a relay CR is provided for inserting a resistor 36 into the excitation circuit for the field winding 23 of the exciter 12 when the braking current exceeds a predetermined amount. The relay CR is provided with a voltage coil 37 which may be energized from a suitable source of potential and a current coil 38 which is connected in series-circuit relation with the armature winding 14 of the motor 13 during the braking operation. Therefore the relay CR is responsive to the braking current.

In order that the functioning of the foregoing apparatus may be more clearly understood, the operation of the system will now be described in more detail. Assuming that it is desired to retard the movement of the vehicle by dynamic braking, the reversing controller RC is actuated to the "brake" position and the throttle drum TD to the #1 position. When the controller RC is in the "brake" position the interlocking relay IR is energized and operates to open its contact members 41 to deenergize the switch P, thereby disconnecting the armature winding 16 of the generator 11 from the armature winding 14 of the motor 13. The energizing circuit for the actuating coil of the relay IR may be traced from positive through a segment 42 of the controller RC, conductor 43, and the actuating coil of the relay IR to negative. At this time the solenoid coil 35 is also energized through the conductor 43, thereby opening the shutters 34.

When the throttle drum TD is on the #1 position and the controller RC on the "brake" position, the reversing switch R is closed to reverse the field for the motor 13. The energizing circuit for the switch R may be traced from the conductor 43 through a segment 44 on the controller TD, conductor 45, a segment 46 on the controller RC, conductor 47, an interlock 48 on the switch P, conductor 49 and the actuating coil of the switch R to negative.

Following the closing of the switch R, the switch C is energized through a circuit which extends from the conductor 49 through an interlock 51 on the switch R, conductor 52, contact members 53 of the relay IR, conductor 54 and the actuating coil of the switch C to negative. Following the closing of the switch C, the switch D is energized through a circuit which extends from the conductor 45 through the actuating coil of the switch D, conductor 55 and an interlock 56 on the switch C to negative. At this time the coil 37 of the relay CR is also energized through a circuit which extends from the segment 44 of the controller TD through conductor 57 and the coil 37 to negative.

As explained hereinbefore, the closing of the switch C connects the armature winding 16 of the generator 11 across the field winding 15 of the motor 14, thereby supplying excitation current to the field winding 15 during the braking operation. Since the reversing switch R is closed at this time, the excitation current from the generator is in the opposite direction to the magnetism established in the field during the motoring operation. Therefore, the current generated by the motor 13 during braking will flow through the armature winding 14 of the motor in the same direction during braking as during the motoring operation. In this manner the division of current between the motor and the generator is such that the total current in each machine is less than in the machines of prior systems.

The closing of contact members 58 of the switch D connects the armature winding 14 of the motor 13 across the resistor 31 and in series-circuit relation with the coil 38 of the relay CR. The closing of contact members 59 of the switch D connects the exciter field winding 23 to the source of control potential, thereby causing the exciter 12 to excite the generator field winding 18. The excitation of the generator field causes the generator to supply excitation current for the motor field winding 15, which, in turn, causes the motor to generate a current that is circulated through the braking resistor 31.

If it is desired to increase the braking effect, the throttle drum TD is moved to a higher engine speed position, thereby causing the pilot motor PM to increase the engine speed. The increase in engine speed results in a higher generator voltage, which, in turn, increases the motor voltage and the braking current generated by the motor. Since the increase in engine speed also increases the speed at which the fan 32 is driven, the ventilation of the resistor 31 is increased by drawing more air through the shutters 34 and across the resistor 31. In this manner an increase in the braking force results in a corresponding increase in the resistor ventilation and in its ability to dissipate the heat produced by the increased braking current.

As explained hereinbefore, the relay CR protects the electrical equipment from producing an excessive braking current because of improper operation of the throttle drum TD. When the braking current which flows through the coil 38 of the relay CR exceeds a predetermined amount the contact members of the relay CR are opened to insert the resistor 36 in series-circuit relation with the field winding 23 of the exciter 12, thereby decreasing the exciter voltage, which, in turn, decreases the generator voltage and the excitation of the motor 13, thereby decreasing the braking current. In this manner the braking current is maintained at a safe value even though the engine is operated at its maximum speed.

From the foregoing description it is apparent that I have provided a control system which is suitable for controlling the operation of an electrically propelled vehicle which is provided with a variable speed prime mover, such as a Diesel or gas engine. The present system utilizes the same engine speed control means for controlling the dynamic braking force as is utilized for controlling the propelling force. Thus, the same number of steps of speed adjustment is available for braking as for power operation and the equipment can be adapted to a wide variety of train weights. The electrical equipment is protected against excessive currents resulting from improper manipulation of the control equipment.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a traction motor having an armature winding and a series field winding, a generator for supplying current to the motor during motoring operation, an engine for driving the generator, a dynamic braking resistor for the motor, switching means for connecting the resistor across the motor armature winding and the generator across the motor field winding to establish dynamic braking connections for the motor, and means for varying the engine speed during both motoring and braking operations, thereby controlling the motoring speed and the braking effect.

2. In a control system, in combination, a traction motor having an armature winding and a series field winding, a generator for supplying current to the motor during motoring operation, an engine for driving the generator, a dynamic braking resistor for the motor, switching means for connecting the resistor across the motor armature winding and the generator across the motor field winding to establish dynamic braking connections for the motor, and manually controlled means for varying the engine speed during both motoring and braking operations, thereby controlling the motoring speed and the braking effect.

3. In a control system, in combination, a traction motor having an armature winding and a series field winding, a generator for supplying current to the motor during motoring operation, an engine for driving the generator, a dynamic braking resistor for the motor, a ventilating fan for the resistor, said fan being driven by the engine, switching means for connecting the resistor across the motor armature winding and the generator across the motor field winding to establish dynamic braking connections for the motor, and means for varying the engine speed to control the braking current and the ventilating effect.

4. In a control system, in combination, a traction motor having an armature winding and a series field winding, a generator for supplying current to the motor during motoring operation, an engine for driving the generator, a dynamic braking resistor for the motor, a ventilating fan for the resistor, said fan being driven by the engine, switching means for connecting the resistor across the motor armature winding and the generator across the motor field winding to establish dynamic braking connections for the motor, means for varying the engine speed to control the braking current and the speed of said fan, and adjustable shutters for controlling the supply of air to the fan.

5. In a control system, in combination, a traction motor having an armature winding and a series field winding, a generator for supplying current to the motor during motoring operation, an engine for driving the generator, a dynamic braking resistor for the motor, a ventilating fan for the resistor, said fan being driven by the engine, switching means for connecting the resistor across the motor armature winding and the generator across the motor field winding to establish dynamic braking connections for the motor, means for varying the engine speed to control the braking current and the speed of said fan, adjustable shutters for controlling the supply of air to the fan, and a solenoid coil for operating said shutters, said coil being energized during braking operation.

6. In a control system, in combination, a traction motor having an armature winding and a series field winding, a generator for supplying current to the motor during motoring operation, an engine for driving the generator, a dynamic braking resistor for the motor, switching means for connecting the resistor across the motor armature winding and the generator across the motor field winding to establish dynamic braking connections for the motor, means for varying the engine speed during both motoring and braking operations, thereby controlling the motoring speed and the braking effect, means for exciting the generator, and interlocking means on said switching means for controlling the operation of said excitation means during braking operation.

7. In a control system, in combination, a traction motor having an armature winding and a series field winding, a generator for supplying current to the motor during motoring operation, an engine for driving the generator, a dynamic braking resistor for the motor, switching means for connecting the resistor across the motor armature winding and the generator across the motor field winding to establish dynamic braking connections for the motor, means for varying the engine speed during both motoring and braking operations, thereby controlling the motoring speed and the braking effect, means for exciting the generator, and relay means responsive to the motor armature current for limiting the generator excitation current during braking operation.

8. In a control system, in combination, a traction motor having an armature winding and a series field winding, a generator for supplying current to the motor during motoring operation, an engine for driving the generator, a dynamic braking resistor for the motor, switching means for connecting the resistor across the motor armature winding and the generator across the motor field winding to establish dynamic braking connections for the motor, means for varying the engine speed during both motoring and braking operations, thereby controlling the motoring speed and the braking effect, an exciter for the generator, said exciter being driven by the engine, interlocking means on said switching means for controlling the operation of said exciter, and relay means responsive to the motor armature current for limiting the generator excitation current during braking operation.

THELBERT L. WEYBREW.